(12) United States Patent
Abe et al.

(10) Patent No.: US 10,173,628 B2
(45) Date of Patent: Jan. 8, 2019

(54) AIRBAG AND AIRBAG APPARATUS

(71) Applicant: JOYSON SAFETY SYSTEMS JAPAN K.K., Tokyo (JP)

(72) Inventors: Kazuhiro Abe, Tokyo (JP); Yasuhito Miyata, Tokyo (JP); Shinji Hayakawa, Tokyo (JP)

(73) Assignee: JOYSON SAFETY SYSTEMS JAPAN K. K., Tokyo (JP)

( * ) Notice: Subject to any disclaimer, the term of this patent is extended or adjusted under 35 U.S.C. 154(b) by 65 days.

(21) Appl. No.: 15/403,378

(22) Filed: Jan. 11, 2017

(65) Prior Publication Data
US 2017/0210327 A1    Jul. 27, 2017

(30) Foreign Application Priority Data

Jan. 26, 2016    (JP) .................................. 2016012535

(51) Int. Cl.
*B60R 21/205*    (2011.01)
*B60R 21/233*    (2006.01)
(Continued)

(52) U.S. Cl.
CPC .......... *B60R 21/205* (2013.01); *B60R 21/231* (2013.01); *B60R 21/233* (2013.01); *B60R 21/239* (2013.01); *B60R 21/2342* (2013.01); *B60R 21/2338* (2013.01); *B60R 21/2346* (2013.01); *B60R 2021/0048* (2013.01);
(Continued)

(58) Field of Classification Search
CPC . B60R 21/205; B60R 21/233; B60R 21/2338; B60R 21/239; B60R 21/2342; B60R 2021/23382; B60R 2021/23386; B60R 2021/2395; B60R 2021/0048; B60R 2021/161; B60R 2021/23576; B60R 21/231; B60R 21/2346
See application file for complete search history.

(56) References Cited

U.S. PATENT DOCUMENTS 5,405,166 A * 4/1995 Rogerson .............. B60R 21/239
                                                    280/728.1
7,195,279 B2 * 3/2007 Rose .................... B60R 21/233
                                                    280/729
(Continued)

FOREIGN PATENT DOCUMENTS

JP        2002-079905 A        3/2002
JP        2014008874 A    *    1/2014

*Primary Examiner* — Laura Freedman
(74) *Attorney, Agent, or Firm* — Foley & Lardner LLP

(57) ABSTRACT

Provided is an airbag and an airbag apparatus that are easy to manufacture and in which the amount of gas to be released from the inside of the airbag when a passenger in proximity is restrained can be increased. An airbag includes a first panel member provided on an instrument-panel side, and a second panel member provided on a passenger side. The first panel member includes a deploying part that is deployable into a tapered cylindrical shape whose diameter increases toward the distal side thereof. The second panel member has on the proximal side thereof a fitting port whose diameter is smaller than the maximum diameter of the deploying part. In a state where the airbag has been inflated, the fitting port is anchored to the deploying part. If a passenger in proximity is restrained, gas is releasable from a clearance.

19 Claims, 11 Drawing Sheets

(51) Int. Cl.
  *B60R 21/2338*  (2011.01)
  *B60R 21/2342*  (2011.01)
  *B60R 21/239*  (2006.01)
  *B60R 21/231*  (2011.01)
  *B60R 21/2346*  (2011.01)
  *B60R 21/00*  (2006.01)
  *B60R 21/16*  (2006.01)
  *B60R 21/235*  (2006.01)

(52) U.S. Cl.
  CPC . *B60R 2021/161* (2013.01); *B60R 2021/2395* (2013.01); *B60R 2021/23382* (2013.01); *B60R 2021/23386* (2013.01); *B60R 2021/23576* (2013.01)

(56) References Cited

U.S. PATENT DOCUMENTS

| | | | |
|---|---|---|---|
| 7,303,207 B2 | 12/2007 | Asai et al. | |
| 7,325,830 B2 | 2/2008 | Higuchi et al. | |
| 7,731,232 B2 * | 6/2010 | Higuchi | B60R 21/233 |
| | | | 280/729 |
| 2009/0224520 A1 | 9/2009 | Higuchi | |

* cited by examiner

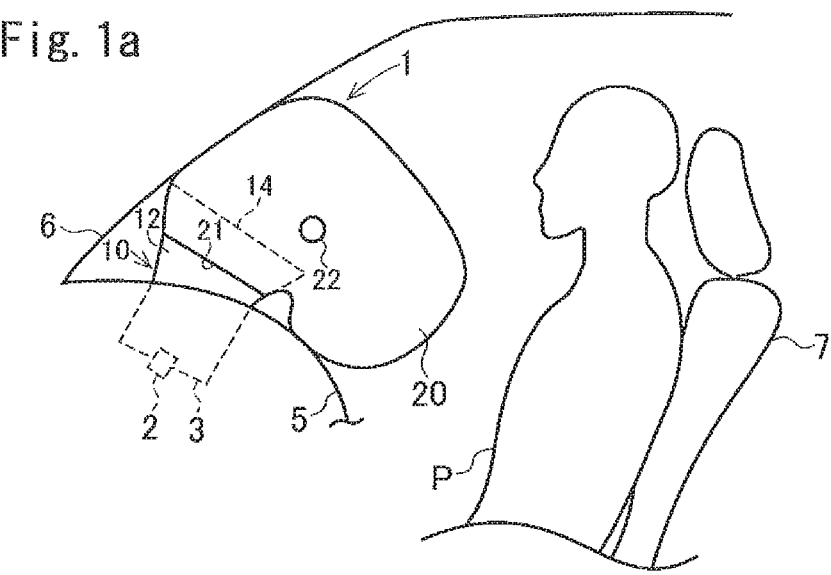
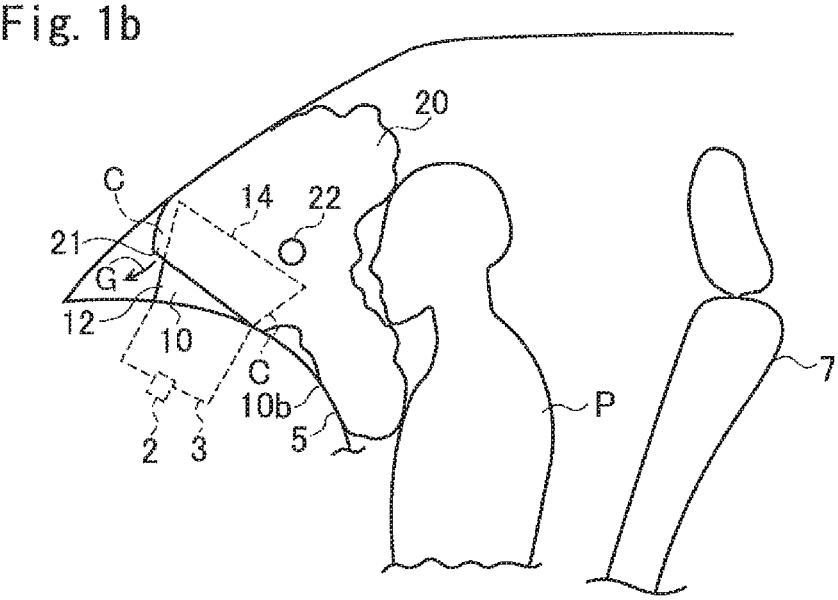

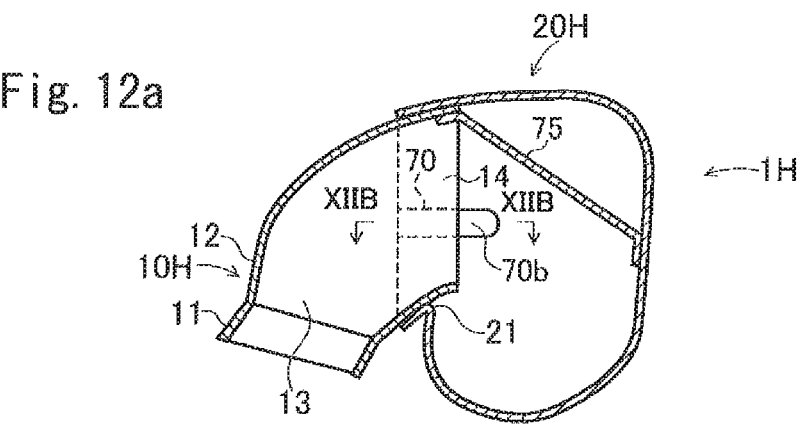
Fig. 12a
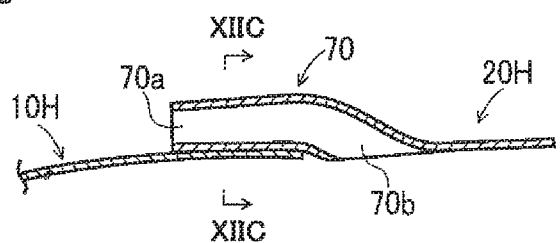
Fig. 12b
Fig. 12c
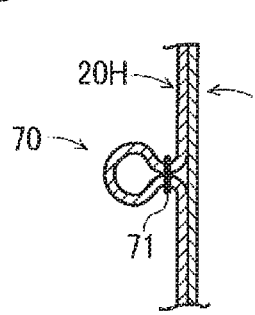
Fig. 12d
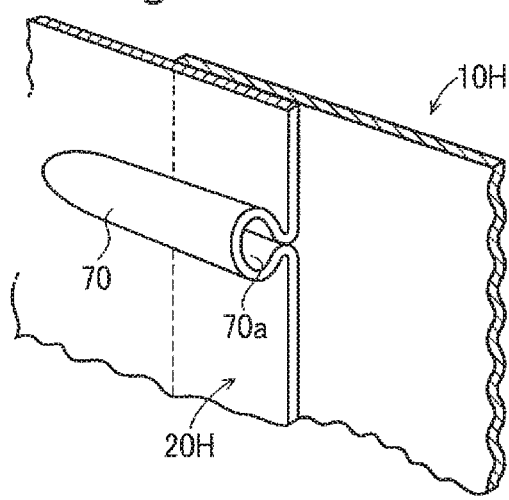

AIRBAG AND AIRBAG APPARATUS

FIELD OF INVENTION

The present invention relates to an airbag and an airbag apparatus for restraining a passenger in a passenger seat of an automobile in the event of collision or the like. The front-rear/top-bottom/left-right directions referred to in the present invention correspond to the front-rear/top-bottom/left-right directions of the automobile equipped with the airbag apparatus, unless otherwise specified.

BACKGROUND OF INVENTION

A passenger-seat airbag apparatus is installed in an instrument panel, and an airbag thereof is inflated and deployed in case of an emergency, thereby restraining a passenger in a passenger seat.

In Patent Literature (PTL) 1, a passenger-seat airbag apparatus is disclosed in which a passenger in a passenger seat who is positioned in proximity to an instrument panel is taken into consideration. According to PTL 1, an airbag includes a first bag provided on an instrument-panel side and a second bag provided on a passenger side. When the airbag is inflated before the passenger positioned in proximity to the instrument panel, a gap is produced between the first bag and the second bag. The gap releases gas to the outside of the airbag.

[PTL 1] Japanese Patent Publication 2007-210500 A

According to PTL 1, since the airbag is formed by partially bonding the first bag and the second bag to each other with adhesive, it time-consuming to manufacture the airbag. Furthermore, since the gap between the first and second bags is produced not over the entire circumference between the first and second bags, it is not easy to increase an amount of gas to be released through the gap when the passenger in proximity to the instrument panel is restrained.

SUMMARY OF INVENTION

It is an object of the present invention to provide an airbag and an airbag apparatus being easy to be manufactured and being capable of increasing the amount of gas to be released from the inside of the inflating airbag when a passenger is in proximity to an instrument panel.

A passenger-seat airbag of the present invention is inflated between a passenger seat and an instrument panel. The airbag includes a first panel member provided on an instrument-panel side of the airbag, and a second panel member provided on a passenger side of the airbag so that gas is suppliable from an inside of the first panel member to an inside of the second panel member. While the airbag is in progress of inflation, a clearance for releasing the gas is produced between a proximal side of the second panel member and the first panel member. The second panel member has a fitting port on an instrument-panel side thereof, and a distal side of the first panel member is placed in the second panel member through the fitting port.

In one embodiment of the present invention, the second panel member is shiftable toward the passenger side with a pressure of the gas supplied from an inflator.

In one embodiment of the present invention, the entire second panel member is shiftable toward the passenger side.

In one embodiment of the present invention, a part of the second panel member is continuous with the first panel member, and another part of the second panel member is shiftable toward the passenger side.

In one embodiment of the present invention, a diameter of the fitting port of the second panel member is smaller than a maximum inflated diameter of the first panel member, and the fitting port of the second panel member is anchorable to the first panel member when the airbag is inflated.

The first panel member includes a deploying part that comes out of the instrument panel when the airbag is inflated, the deploying part being deployed into a tapered cylindrical shape whose diameter increases from the proximal side toward the distal side, and the diameter of the deploying part is the maximum inflated diameter.

In one embodiment of the present invention, the airbag further includes at least one tether that connects the second panel member and the first panel member or a retainer to each other.

In one embodiment of the present invention, the tether is provided at least on each of left and right sides of the airbag.

In one embodiment of the present invention, the tether is provided at least on an upper side of the airbag.

In one embodiment of the present invention, the tether extends along an outer surface of the airbag.

In one embodiment of the present invention, the airbag further includes an inner tether provided inside the airbag and connecting a passenger-side surface of the second panel member and the first panel member to each other.

In one embodiment of the present invention, the airbag further includes a guide member that guides the tether.

In one embodiment of the present invention, the guide member has a loop part provided on the first panel member.

In one embodiment of the present invention, the tether includes an extendable structure whose length gradually increases when a tension greater than predetermined is applied to the tether.

In one embodiment of the present invention, the extendable structure includes a tearable part or a tearable seam.

In one embodiment of the present invention, the second panel member includes a tucked part provided on an inner circumference of the fitting port.

In one embodiment of the present invention, the first panel member has a bag shape and has a plurality of gas outlets.

In one embodiment of the present invention, the second panel member includes, at the fitting port, a duct part that allows an inside of the airbag and an outside of the airbag to communicate with each other when the airbag is completely inflated.

In one embodiment of the present invention, the first panel member has, on the passenger side, a vent part that is opened when the airbag is completely inflated and the second panel member that covers the vent part is at least partially removed.

An airbag apparatus of the present invention includes the airbag of the present invention, a retainer that stores the airbag in a folded state, and an inflator that inflates the airbag.

Advantageous Effects of Invention

The airbag according to the present invention includes the first panel member and the second panel member. In a state where the airbag is inflated to have a final deployed shape, the fitting port of the second panel member is anchored to the first panel member. In a case of restraining of a passenger in proximity in which the passenger is received by the airbag that is still being inflated, the gas is released from the clearance produced between the fitting port of the second panel member and the first panel member.

In the airbag according to the present invention, there is no need to connect the first panel member and the second panel member by bonding. Therefore, the airbag is easy to manufacture. Furthermore, in the airbag according to the present invention, a clearance can be produced over a wide range between the fitting port of the second panel member and the outer circumference of the first panel member. Therefore, the amount of gas to be released in the case of restraining of a passenger in proximity can be increased.

If a tether that connects the first panel member and the second panel member is provided, the second panel member is anchored by the tether as well. If the tether has an extendable structure, the length of the tether gradually increases while the airbag is inflated. Therefore, the second panel member is slowly moved (shifted) toward the passenger side.

BRIEF DESCRIPTION OF DRAWINGS

FIGS. 1a and 1b are side views of an airbag apparatus according to an embodiment.

FIGS. 3a and 3b are sectional diagrams taken along III-III line illustrated in FIG. 2a.

FIG. 12a is a sectional view of an airbag according to yet another embodiment, FIG. 12b is a sectional view taken along XIIB-XIIB line illustrated in FIG. 12a, FIG. 12c is a sectional view of XIIC-XIIC line illustrated in FIG. 12b, and FIG. 12d is a perspective view of a part of the airbag.

FIG. 13b is a sectional view taken along XIIIB-XIIIB line in FIG. 13a.

DESCRIPTION OF EMBODIMENTS

Figure 2A:
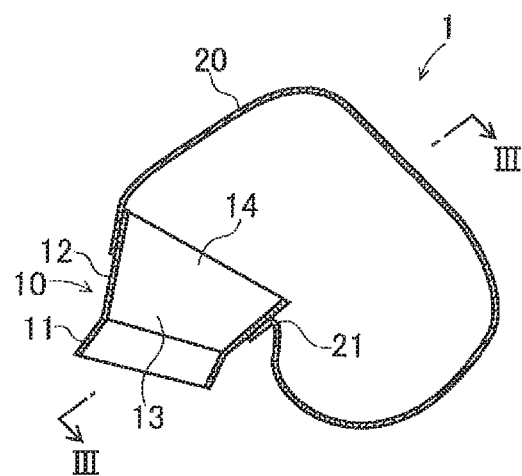
FIGS. 2a and 2b are sectional views of an airbag according to the embodiment.
Figure 2B:
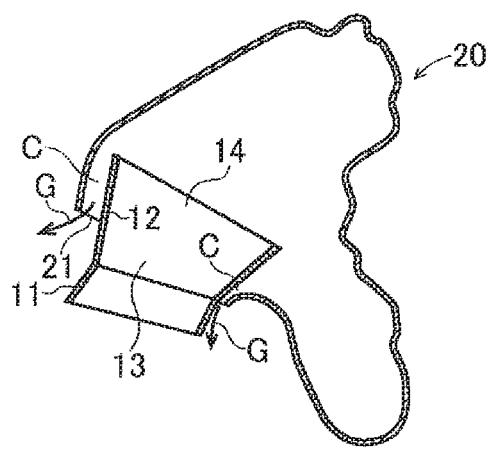
Figure 3A:
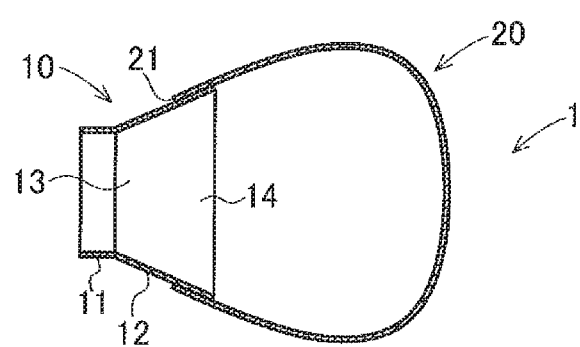
Figure 3B:
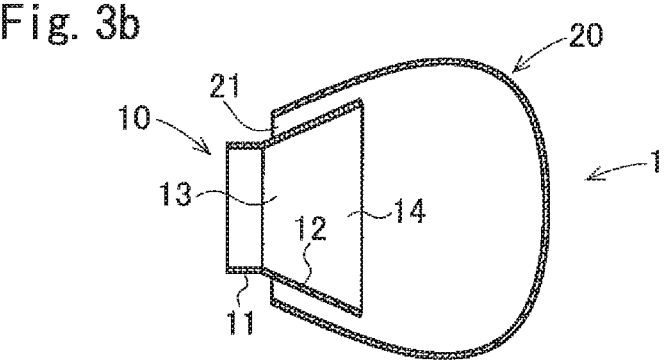

Referring to FIGS. 1a to 3b, an airbag apparatus according to a first embodiment will now be described. FIGS. 1a-2b include side views and sectional views, respectively, of the airbag apparatus when an airbag according to the embodiment has been inflated and deployed. FIGS. 1a and 2a illustrate a state of the inflated airbag with a passenger not in proximity thereto. FIGS. 1b and 2a illustrate a state of the inflated airbag with the passenger in proximity thereto. FIG. 3a is a sectional diagram taken along line III-III illustrated in FIG. 2. FIG. 3b illustrates a state where a second panel member illustrated in FIG. 3 has been shifted toward an instrument-panel side.

The airbag apparatus according to the present embodiment includes an airbag 1 that is in a folded state at normal times but is inflated and deployed in case of an emergency, an inflator 2 that supplies gas to the airbag 1, a retainer 3 where the airbag 1 and the inflator 2 are attached, and so forth. The airbag apparatus is a passenger-seat airbag apparatus and is installed in an instrument panel 5 provided in front of a passenger seat 7. The airbag 1 is inflated and deployed in a space surrounded by a passenger P, the instrument panel 5, and a windshield 6. The airbag 1 is inflated and deployed substantially in front of the passenger P.

The inflator 2 has a substantially columnar outer shape and has a gas ejection port in a side peripheral surface at a distal end thereof placed in the airbag 1. The inflator 2 is fixed to the retainer 3.

The airbag 1 includes a first panel member 10 and a second panel member 20. As explicitly illustrated in FIGS. 2a-3b, the first panel member 10 includes a proximal part 11 attached to the retainer 3 and having a cylindrical shape, and a deploying part 12 continuous with the proximal part 11 and that is deployable when coming out of the instrument panel 5. In the present embodiment, the proximal part 11 is attached to the retainer 3 with an attaching metal member and a bolt or a rivet (not illustrated). The proximal part 11 may be longer than illustrated so as to be placed deeply into the retainer 3.

The deploying part 12 has a tapered cylindrical shape with a small diameter on a side thereof adjoining the proximal part 11, the diameter increasing with the distance from the proximal part 11. The deploying part 12 has a small-diameter outlet 13 on the side thereof adjoining the proximal part 11, and a large-diameter outlet 14 on the opposite side thereof. In the present embodiment, the diameter of the outlet 14 in the inflated state corresponds to a maximum inflated diameter of the first panel member 10. The second panel member 20 has a bag shape and has a fitting port 21 on a side thereof facing the first panel member 10. As illustrated in FIGS. 1a and 1b, a vent hole 22 is provided on each of the left and right sides of the second panel member 20.

The diameter of the fitting port 21 is smaller than the diameter (the maximum inflated diameter) of the outlet 14. The distal side of the first panel member 10 is placed in the second panel member 20 through the fitting port 21. Hence, if the airbag 1 is inflated to have a final deployed shape, a part near the fitting port 21 is tightly fitted to a part near the outlet 14, whereby the second panel member 20 is anchored to the first panel member 10.

The airbag 1 is folded, and the folded body is stored in the retainer 3. Thus, the airbag apparatus is provided.

When an automobile equipped with the above airbag apparatus has a collision, the inflator 2 is activated and the gas is supplied into the airbag 1 from the inflator 2, whereby the airbag 1 comes out of the instrument panel 5.

If the passenger P is sitting with, for example, his/her back placed against the back of the passenger seat 7 as illustrated in FIG. 1a and is therefore positioned far from the instrument panel 5, the airbag 1 is inflated and deployed in a space surrounded by the instrument panel 5, the windshield 6, and the passenger P. When the airbag 1 is inflated and deployed into the final deployed shape, the deploying part 12 of the first panel member 10 is deployed into a tapered cylindrical shape. The second panel member shifts in its entirety toward the passenger side so that the fitting port 21 is tightly fitted to the outlet 14, whereby the second panel member 20 is anchored to the first panel member 10. Thus, the panel members 10 and 20 are integrated with each other to form one bag-shaped airbag 1. When the airbag 1 in such a state receives the passenger P, the gas in the airbag 1 is released from the vent hole 22.

If the inflator 2 is activated with the passenger P positioned in proximity to the instrument panel 5 as illustrated in FIG. 1b, the second panel member 20 receives the passenger P before the airbag 1 is inflated to have the final deployed shape.

In such a case, the fitting port 21 of the second panel member 20 is not yet tightly fitted to the deploying part 12 of the first panel member 10, and there is a clearance C between the inner surface of the fitting port 21 and the deploying part 12 over substantially the entire circumference of the first panel member 10. Therefore, the gas in the airbag 1 that has received the passenger P is released not only from the vent holes 22 but also from the clearance C produced between the deploying part 12 of the first panel member 10 and the inner surface of the fitting port 21 of the second panel member 20 as represented by arrows G.

Thus, the airbag apparatus is configured with a consideration for the passenger positioned in proximity to the instrument panel 5.

The airbag 1 is easy to be manufactured because no adhesive is used for connecting the first panel member 10 and the second panel member 20 to each other. Moreover, when the passenger in proximity is restrained, the clearance C can be produced over substantially the entire circumference of the first panel member 10, and the amount of gas to be released can thus be increased.

Figure 4A:
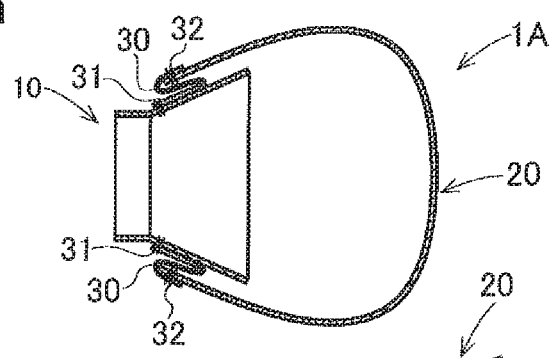
FIGS. 4a and 4b are sectional views of an airbag apparatus according to another embodiment.
Figure 4B:
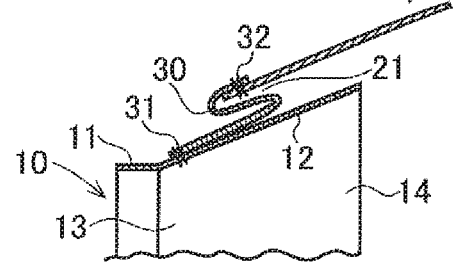

FIGS. 4a and 4b include sectional views of an airbag 1A according to another embodiment. FIG. 4a is a sectional diagram illustrating a state that is equivalent to the state illustrated in FIG. 3b. FIG. 4b is an enlargement of a part illustrated in FIG. 4a.

The airbag 1 described above is configured such that the second panel member 20 is prevented from coming off the first panel member 10 only by the fitting of the fitting port 21 thereof to the deploying part 12 of the first panel member 10. The airbag 1A illustrated in FIGS. 4a and 4b additionally includes one or a plurality of tethers 30 that connect the first panel member 10 and the second panel member 20 to each other.

The tethers 30 may be provided on each of the left and right sides of the airbag, or on the upper side of the airbag, or on each of the upper and lower sides of the airbag, or on each of the left, right, and upper sides of the airbag, or on each of the left, right, upper, and lower sides of the airbag.

Each tether 30 has a belt shape with one end thereof sewed to the first panel member 10 at a sewed part 31 and the other end thereof sewed to the second panel member 20 at a sewed part 32. In such an embodiment, the one end of the tether 30 is sewed to a position of the deploying part 12 that is near the proximal part 11, and the other end of the tether 30 is sewed to a position of the second panel member 20 that is near the edge of the fitting port 21. The length of the tether 30 is set such that the tether 30 becomes tense when the airbag 1A is inflated to have the final deployed shape and the fitting port 21 of the second panel member 20 is tightly fitted to the deploying part 12 of the first panel member 10. In FIGS. 4a and 4b, each tether 30 has a slack.

The other elements of the airbag 1A illustrated in FIGS. 4a and 4b are the same as those of the airbag 1, and the same reference numerals denote the same elements, respectively.

Figure 5A:
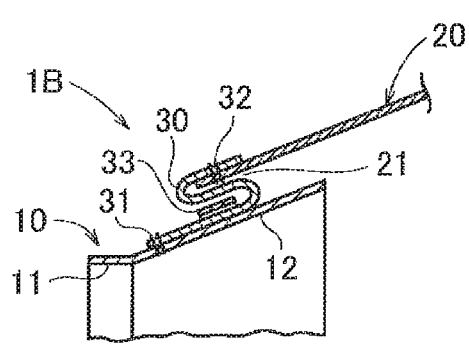
FIG. 5a is a sectional view of a part an airbag according to yet another embodiment.
Figure 5B:
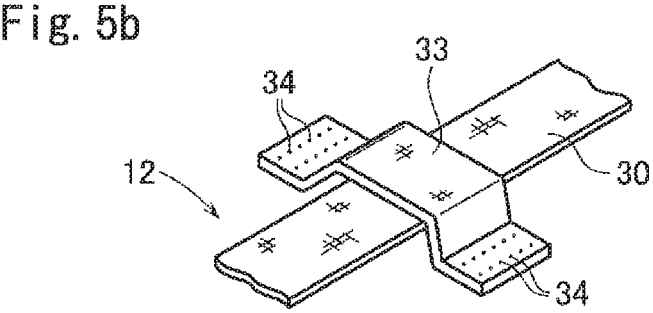
FIG. 5b is a perspective view of a part thereof.

FIG. 5a is an enlarged sectional view of a part of an airbag 1B according to yet another embodiment and illustrates a section that is equivalent to the section illustrated in FIG. 4b. FIG. 5b is a perspective view of a guide member.

The airbag 1B includes a guide member (a loop part 33 in the present embodiment) that guides the tether 30. Two ends of the loop part 33 are sewed to the deploying part 12 at respective sewed parts 34, between which the tether 30 is made to pass. The other elements of the airbag 1B illustrated in FIGS. 5a and 5b are the same as those of the airbag 1A, and the same reference numerals denote the same elements, respectively.

Figure 6A:
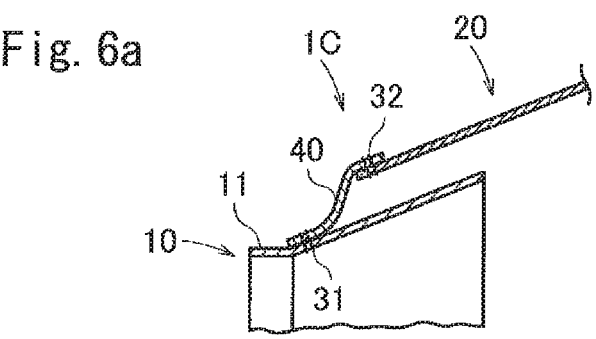
FIG. 6a is a sectional view of a part an airbag according to yet another embodiment.
Figure 6B:
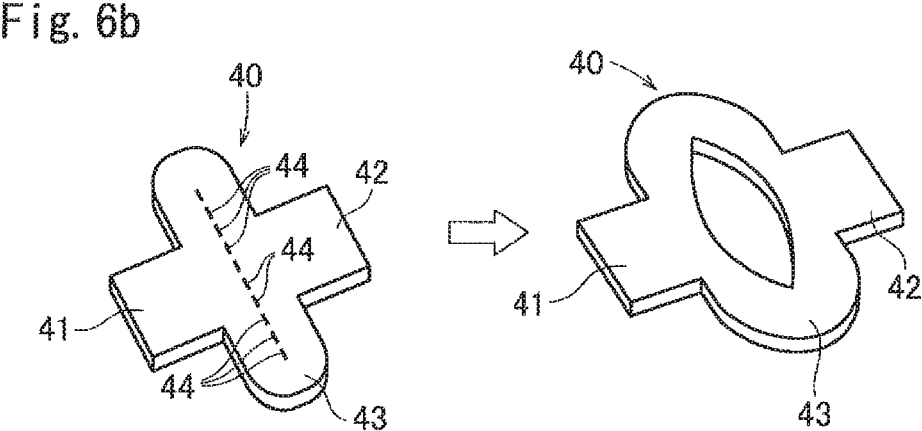
FIG. 6b is a perspective view of a part thereof.

In the present invention, as in the case of an airbag 1C illustrated in FIGS. 6a and 6b, a tether 40 having an extendable structure whose length gradually increases with the deployment of the airbag may be employed. The tether 40 has one end 41 thereof sewed to the first panel member 10 at the sewed part 31 and another end 42 thereof sewed to the second panel member 20 at the sewed part 32. The tether 40 includes a wide part 43 in the middle thereof. The width of the wide part 43 is increased in an orthogonal direction that is orthogonal to a direction from one end 41 to the other end 42. The wide part 43 has a tearable part formed of a line of slits 44 arranged in the orthogonal direction.

When the airbag 1C is inflated and a tension greater than predetermined is applied thereto in the direction from the one end 41 to the other end 42, the tearable part is torn such that the slits 44 are connected to one another as illustrated in FIG. 6b. Thus, the length between the one end 41 and the other end 42 gradually increases. The other elements of the airbag 1C illustrated in FIGS. 6a and 6b are the same as those of the airbag 1A, and the same reference numerals denote the same elements, respectively.

Figure 7:
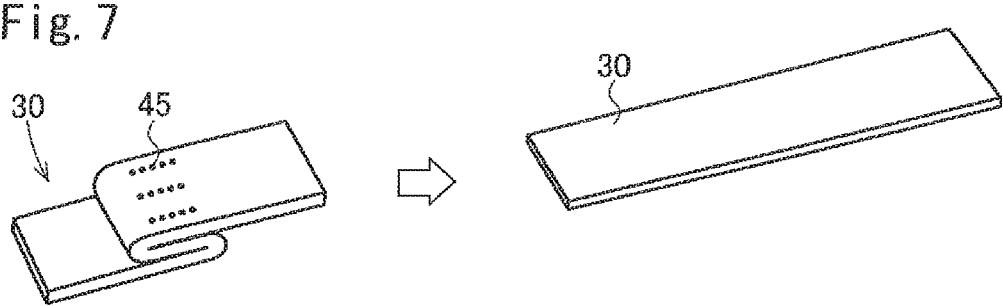
FIG. 7 is a perspective view of a tether.

Instead of employing the tether 40 illustrated in FIGS. 6a and 6b, a middle part of the tether 30 may be folded and sewed up with tearable seams 45 as illustrated in FIG. 7. When a tension greater than predetermined is applied to the tether 30, the tearable seams 45 are gradually torn and the length of the tether 30 gradually increases.

Figure 8A:
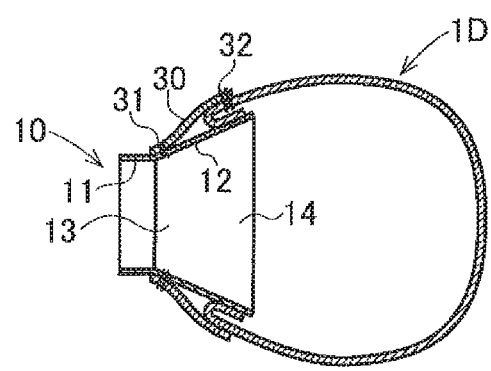
FIG. 8a is a sectional view of an airbag apparatus according to yet another embodiment.
Figure 8B:
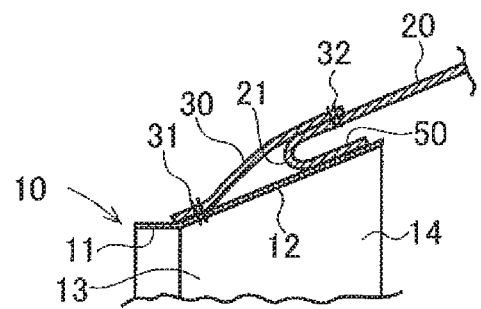
FIG. 8b is a sectional view of a part thereof.

An airbag 1D illustrated in FIGS. 8a and 8b includes a tucked part 50 provided by folding the edge of the fitting port 21 of the second panel member 20 over the entire circumference of the panel member 20 and toward the inner side of the bag. When the airbag 1D is inflated to have the final deployed shape, the tucked part 50 is pressed against the deploying part 12 with the pressure of the gas in the second panel member 20. Consequently, the airtightness between the proximal side of the second panel member 20 and the first panel member 10 is improved.

In FIGS. 8a and 8b, the tucked part 50 is provided by folding the edge of the fitting port 21 of the second panel member 20. Alternatively, as in the case of an airbag 1E illustrated in FIG. 9, a tucked part 51 made of a piece of cloth that is separate from the second panel member 20 may be sewed to the second panel member 20 at a sewed part 52. When the airbag 1E is inflated to have the final deployed shape, the tucked part 51 bulges and is pressed against the deploying part 12 with the pressure of the gas in the second panel member 20. Consequently, the airtightness between the proximal side of the second panel member 20 and the first panel member 10 is improved.

Figure 9:
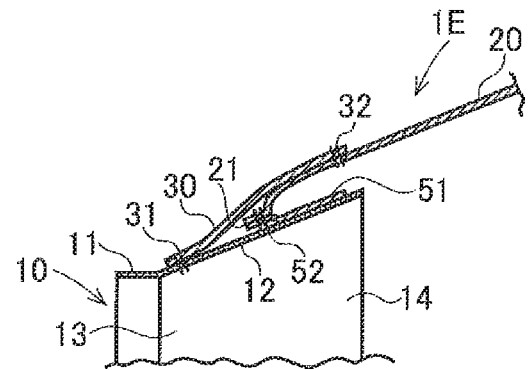
FIG. 9 is a sectional view of an airbag according to yet another embodiment.

The other elements of each of the airbags 1D and 1E illustrated in FIGS. 8a, 8b and 9 are the same as those of the airbag 1A, and the same reference numerals denote the same elements, respectively.

Figure 10:
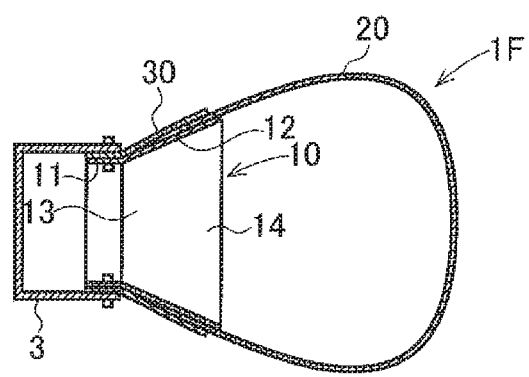
FIG. 10 is a sectional view of an airbag apparatus according to yet another embodiment.

In each of the above embodiments employing any tethers, one end of the tether 30 or 40 is sewed to the first panel member 10. Alternatively, as in the case of an airbag 1F illustrated in FIG. 10, one end of the tether 30 (or 40) may be attached to the retainer 3. In such a case, the one end of the tether 30 (or 40) may be attached to the retainer 3 with an attaching member shared with the first panel member 10. The other elements of the airbag 1F illustrated in FIG. 10 are the same as those of the airbag 1A, and the same reference numerals denote the same elements, respectively.

Figure 11:
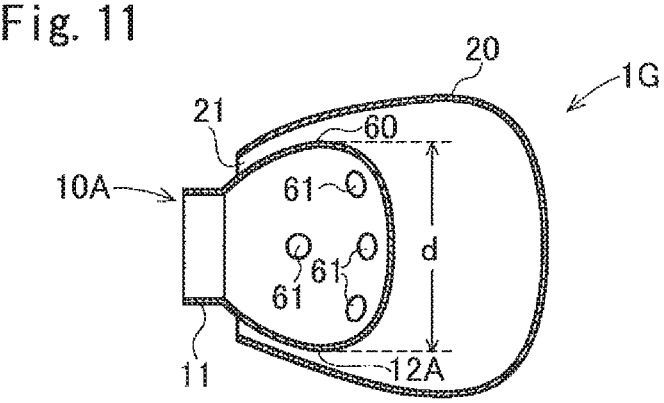
FIG. 11 is a sectional view of an airbag according to yet another embodiment.

FIG. 11 is a sectional view of an airbag 1G according to yet another embodiment and illustrates a section equivalent to the section illustrated in FIG. 3b.

In each of the airbags 1 to 1F described above, the distal side of the first panel member 10 has a tapered cylindrical shape. The airbag 1G illustrated in FIG. 11 includes a first panel member 10A including a bag-shaped deploying part 12A. The deploying part 12A of the first panel member 10A does not have the large-diameter outlet 14 but has a plurality of small outlets 61 on the distal side thereof.

When the airbag 1G is inflated to have the final deployed shape, the deploying part 12A is shaped such that an inflated diameter d gradually increases from the side adjoining the proximal part 11 to a maximum-inflated-diameter part 60 and then gradually decreases from the maximum-inflated-diameter part 60 to the distal side. The inflated diameter d at the maximum-inflated-diameter part 60 is larger than the diameter of the fitting port 21 of the second panel member 20 in the inflated state. Therefore, if the airbag 1G is inflated to have the final deployed shape, the fitting port 21 is tightly anchored to the maximum-inflated-diameter part 60. Thus, the first panel member 10A and the second panel member 20 are integrated with each other.

The other elements of the airbag 1G illustrated in FIG. 11 are the same as those of the airbag 1, and the same reference numerals denote the same elements, respectively. In the case illustrated in FIG. 11 also, a tether or a tucked part may be provided. Each of the airbags 1 to 1G described above may further be provided with an inner tether, as with each of airbags 1H to 1J described below.

FIGS. 12a and 12b illustrate an airbag 1H including a second panel member provided with a duct part that allows the inside and the outside of the airbag to communicate with each other at the completion of inflation. In FIG. 12a illustrates a section equivalent to the section illustrated in FIG. 2a, FIG. 12b is a sectional diagram taken along line XIIB-XIIB illustrated in FIG. 12a, FIG. 12c is a sectional diagram taken along line XIIC-XIIC illustrated in FIG. 12b and FIG. 12d is a sectional perspective diagram illustrating elements near the duct part.

A part of a second panel member 20H that is near the edge of the fitting port 21 is pinched, and the base of the pinched part is sewed with sewing thread 71, whereby a duct part 70 is provided. One end 70a of the duct part 70 is open to the outside of the airbag 1H. Another end 70b of the duct part 70 is open to the inside of the airbag 1H that is completely inflated.

The duct part 70 serves as a vent hole that releases the gas in the airbag 1H to the outside of the airbag 1H when the passenger is restrained.

In the present embodiment, an inner tether 75 that connects the upper side of the distal end of a first panel member 10H and the passenger-side surface of the second panel member 20H to each other is provided. Although not illustrated, the airbag 1H may further include any of the tethers described above. The other elements illustrated in FIGS. 12a-12d are the same as those of the airbag 1, and the same reference numerals denote the same elements, respectively.

Figure 13A:
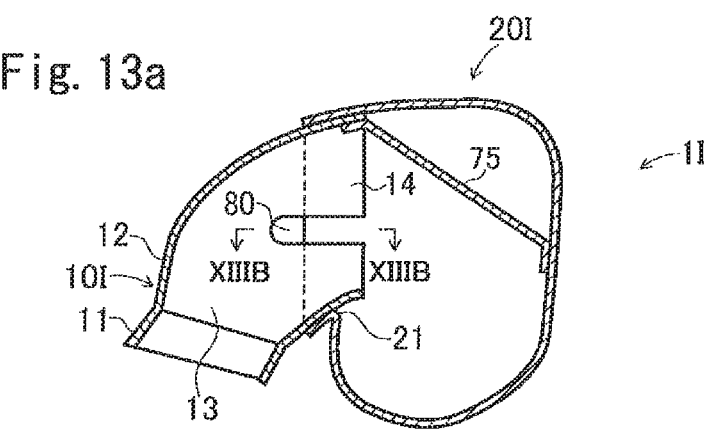
FIG. 13a is a sectional view of an airbag according to yet another embodiment.
Figure 13B:
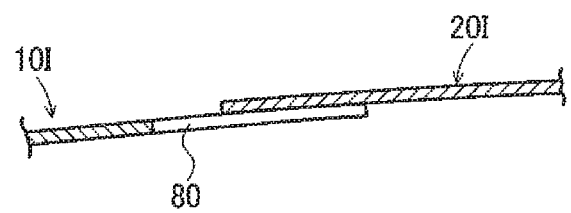

FIGS. 13a and 13b illustrate an airbag 1I including a first panel member 10I having a vent part 80 that allows the inside and the outside of the airbag to communicate with each other at the completion of inflation. FIG. 13a illustrates a section that is equivalent to the section illustrated in FIG. 2a, and FIG. 13b illustrates a section taken along line XIIIB-XIIIB illustrated in FIG. 13a.

The vent part 80 extends from the distal edge of the first panel member 10I toward the proximal side of the first panel member 10I. Before the airbag 1I is inflated substantially completely, a part of a second panel member 20I that is near the fitting port 21 covers the entirety of the vent part 80. When the airbag 1I is inflated substantially completely, the second panel member 20I is shifted toward the passenger side, whereby a portion (the extreme end on the proximal side) of the vent part 80 is opened without being covered with the second panel member 20I. Thus, the gas in the airbag 1I is released from the vent part 80.

In the present embodiment, the inner tether 75 is employed. Additionally, any other tethers may be provided. The other elements illustrated in FIGS. 13a and 13b are the same as those of the airbag 1, and the same reference numerals denote the same elements, respectively.

In the airbag according to each of the above embodiments, the first panel member and the second panel member are separate from each other. Alternatively, the first panel member and the second panel member may be partially connected to and integrated with each other. Particularly, the first panel member and the second panel member may be connected to each other at least partially at the lower edge of the outlet 14 of the first panel member and the lower edge of the fitting port 21 of the second panel member.

Figure 14A:
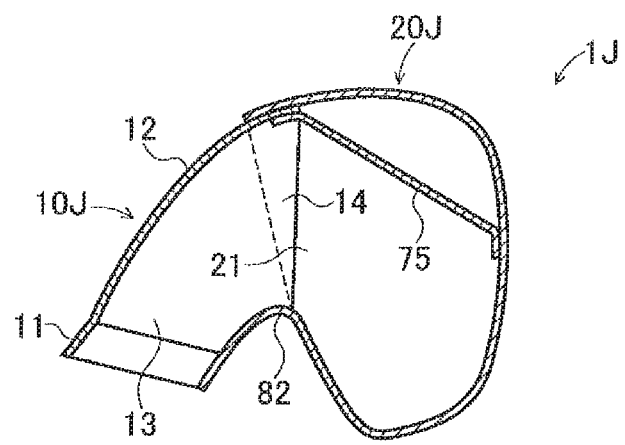
FIGS. 14a and 14b are sectional views of an airbag according to yet another embodiment.
Figure 14B:
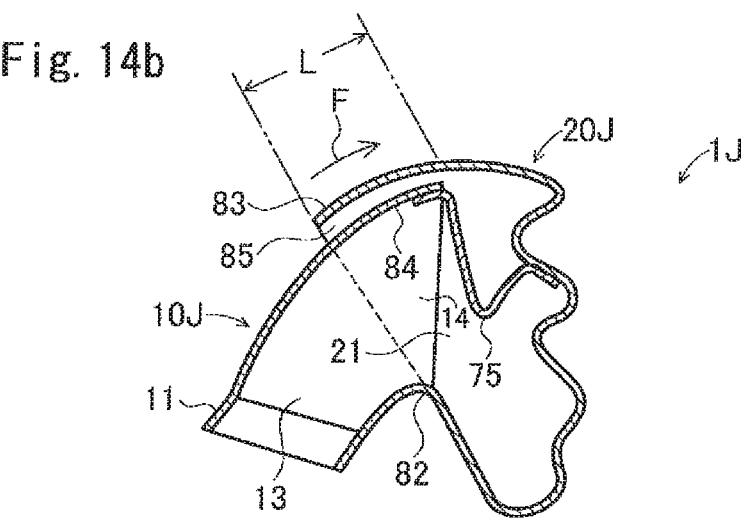

FIGS. 14a and 14b illustrate an airbag 1J having such a configuration. FIGS. 14a and 14b illustrate sections that are equivalent to the sections illustrated in FIG. 2a and FIG. 2b, respectively.

In the airbag 1J, a first panel member 10J and a second panel member 20J are continuous with each other at a connected part 82. The connected part 82 corresponds to the lower edge of each of the outlet 14 and the fitting port 21.

The first panel member 10J and the second panel member 20J may be continuous with each other with the base fabric at the bottom surface of the airbag 1J and the base fabric at the bottom surface of the second panel member 20J being continuous with each other over the connected part 82. Alternatively, the first panel member 10J and the second panel member 20J may be continuous with each other by being sewed up at the connected part 82.

As illustrated in FIG. 14b, while the inflation is in progress, a top part 83 of the second panel member 20J and a top part 84 of the first panel member 10J overlap each other by a long length in the front-rear direction. In such a state, a clearance 85 is produced between the top parts 83 and 84. Hence, if the passenger is restrained by the airbag 1J in the state illustrated in FIG. 14b, the gas is released from the clearance 85.

As the inflation further progresses from the state illustrated in FIG. 14b, the top part 83 of the second panel member 20J shifts in a direction of an arrow F while rotating about the connected part 82. Consequently, as illustrated in FIG. 14a, the airbag 1J is completely inflated with the top parts 83 and 84 being fitted to each other.

The airbag 1J, which includes the inner tether 75, may include any of the above tethers as well. The other elements illustrated in FIGS. 14a and 14b are the same as those of the airbag 1, and the same reference numerals denote the same elements, respectively.

The present invention is not limited to the above embodiments. Various changes can be made to the above embodiments without departing from the scope of the present invention, of course.

This application claims the benefit of Japanese Patent Application No. 2016-12535 filed Jan. 26, 2016, which is hereby incorporated by reference herein in its entirety.

The invention claimed is:

1. A passenger-seat airbag that is inflated between a passenger seat and an instrument panel, the airbag comprising:
a first panel member provided on an instrument-panel side of the airbag; and
a second panel member provided on a passenger side of the airbag so that gas is suppliable from an inside of the first panel member to an inside of the second panel member,
at least one tether that connects the second panel member and the first panel member or a retainer to each other,
whereby, while the airbag is in progress of inflation, a clearance for releasing the gas is produced between a proximal side of the second panel member and the first panel member,
wherein the second panel member has a fitting port on an instrument-panel side thereof, and a distal side of the first panel member is placed in the second panel member through the fitting port.

2. The airbag according to claim 1, wherein the second panel member is shiftable toward the passenger side with a pressure of the gas supplied from an inflator.

3. The airbag according to claim 2, wherein the entire second panel member is shiftable toward the passenger side.

4. The airbag according to claim 2, wherein a part of the second panel member is continuous with the first panel member, and another part of the second panel member is shiftable toward the passenger side.

5. The airbag according to claim 1, wherein a diameter of the fitting port of the second panel member is smaller than a maximum inflated diameter of the first panel member, and the fitting port of the second panel member is anchorable to the first panel member when the airbag is inflated.

6. The airbag according to claim 5,
wherein the first panel member includes a deploying part that comes out of the instrument panel when the airbag is inflated, the deploying part being deployed into a tapered cylindrical shape whose diameter increases from the proximal side toward the distal side, and
wherein the diameter of the deploying part is the maximum inflated diameter.

7. The airbag according to claim 1, wherein the tether is provided at least on each of left and right sides of the airbag.

8. The airbag according to claim 1, wherein the tether is provided at least on an upper side of the airbag.

9. The airbag according to claim 1, wherein the tether extends along an outer surface of the airbag.

10. The airbag according to claim 1, further comprising an inner tether provided inside the airbag and connecting a passenger-side surface of the second panel member and the first panel member to each other.

11. The airbag according to claim 1, further comprising a guide member that guides the tether.

12. The airbag according to claim 11, wherein the guide member has a loop part provided on the first panel member.

13. The airbag according to claim 1, wherein the tether includes an extendable structure whose length gradually increases when a tension greater than a predetermined tension is applied to the tether.

14. The airbag according to claim 13, wherein the extendable structure includes a tearable part or a tearable seam.

15. The airbag according to claim 1, wherein the second panel member includes a tucked part provided on an inner circumference of the fitting port.

16. The airbag according to claim 1, wherein the first panel member has a bag shape and has a plurality of gas outlets.

17. The airbag according to claim 1, wherein the second panel member includes, at the fitting port, a duct part that allows an inside of the airbag and an outside of the airbag to communicate with each other when the airbag is completely inflated.

18. The airbag according to claim 1, wherein the first panel member has, on the passenger side, a vent part that is opened when the airbag is completely inflated and the second panel member that covers the vent part is at least partially removed.

19. An airbag apparatus comprising: the airbag according to claim 1; the retainer that stores the airbag in a folded state; and an inflator that inflates the airbag.

* * * * *